Patented Jan. 3, 1950

2,493,615

UNITED STATES PATENT OFFICE 2,493,615

BETA-CHLOROETHYL-p-TRICHLORO-
METHYL BENZOATE

John H. Bryden, Pasadena, Calif., assignor to
E. I. du Pont de Nemours & Company, Wilmington, Del., a corporation of Delaware No Drawing. Application June 23, 1947,
Serial No. 756,561

1 Claim. (Cl. 260—476)

This invention relates to beta-chloroethyl-p-trichloromethyl benzoate and to acaricidal compositions and methods using the compound as an active toxicant.

The compound is represented by the formula

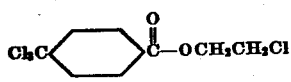

Beta - chloroethyl - p - trichloromethyl benzoate is a water-white liquid. It is prepared by the reaction of trichloromethyl benzoyl chloride with ethylene chlorohydrin.

I have found that the new compound beta-chloroethyl-p-trichloromethyl benzoate is particularly useful as a toxicant in acaricidal compositions, that is, compositions which are useful in the control of animals of the order Acarina which are more commonly known as acarids and include mites and ticks.

In order to prepare the acaricidal compositions of the invention, beta-chloroethyl-p-trichloromethyl benzoate is formulated with appropriate adjuvants to give solutions, dust compositions, or slurries or emulsions in water.

Acaricides find their greatest use in agriculture for the treatment of growing crops in order to control and eliminate infestations by mites and ticks. The acaricidal compositions of this invention are generally applied for such use in the form of dusts or aqueous sprays containing the toxicant beta - chloroethyl - p - trichloromethyl benzoate. In such use the concentration of the toxicant of the invention in the actual composition applied to the vegetation is in the order of 0.05 to 0.5 per cent by weight.

It is preferred according to this invention to prepare acaricidal concentrates, that is solutions or dusts containing the toxicant of the invention in high concentration. These concentrates, then, are dispersed or diluted before actual application to the vegetation. Such dispersion or dilution is obtained by mixing the compositions with additional amounts of diluent solvents or dusts or more preferably by dispersing the compositions in water to give aqueous emulsions or suspensions which are readily applied to the growing crop.

The adjuvant used in preparing a dust composition of this invention is preferably selected from the class of finely divided solids comprising talcs, pyrophyllite, natural clays, and diatomaceous earth, such materials having a frequency particle size of less than 50 microns. Other adjuvants which may be used in dust compositions include such finely divided powders as calcium phosphate, calcium carbonate, magnesium carbonate, sulfur, lime, and flours such as walnut shell, wheat, redwood, soya bean, and cottonseed.

A powdered composition for use in the preparation of a spray in the form of an aqueous suspension of finely divided solid particles is preferably produced in the form of a powder containing one of the adjuvants common to the dust compositions described above. The powder is then dispersed for actual usage in the water usually with the aid of an adjuvant such as a wetting, dispersing, or emulsifying agent.

Typical of the wetting, dispersing and emulsifying agents suitable for use in preparing water-dispersible compositions of the invention are the sulfated higher alcohols, polyvinyl alcohols, polyethylene oxides, the alkali metal or amine salts of oleic acid, the sulfonated animal and vegetable oils such as sulfonated fish and castor oils, the sulfonated petroleum oils, alkali metal salts of alkylnaphthalene sulfonic acids, and such proprietary preparations as are listed in detail in Bulletin E-607 of the Bureau of Entomology and Plant Quarantine of the U. S. Dept. of Agriculture.

If the composition is desired in the form of a liquid to be used as a dispersion or emulsion in water, then it is preferred to prepare a relatively concentrated composition of beta-chloroethyl-p-trichloromethyl benzoate in a suitable solvent selected according to the use to which it is to be put or to prepare an emulsion of the active agent in a non-solvent in certain cases where such technique is more applicable, such solutions or emulsions are subsequently dispersed in water to permit suitable application. In substantially all compositions prepared for ultimate use as emulsions in water, the essential adjuvant is a wetting, dispersing, or emulsifying agent, such as have been detailed above.

Solvents suitable for use in preparing solutions of emulsions of the compound of this invention are kerosene, trichloroethylene, tetrachloroethylene, alkylated naphthalene, xylene, toluene, cyclohexanone, and acetone.

In addition to beta-chloroethyl-p-trichloromethyl benzoate, the aforementioned compositions of the invention may include other insect toxicants such as metallic arsenates, fluosilicates, phenothiazines, 2,2-bis(para - chlorophenyl) - 1,1,1-trichloroethane and 2,2-bis(para-methoxyphenyl)-1,1,1-trichloroethane, organic thiocyanates such as n-dodecyl thiocyanate, fenchyl thiocyanoacetate and beta(thiocyanoethyl)beta-(butoxyethyl)ether, nicotine, anabasine (neonicotine), nor-nicotine, rotenone and its congeners, sabadilla, ryania, hellebore, pyrethrum, N-isobutyl-undecylanamide, aminomethyl sulfides, and 1,2,4,5,6,7,8,8-octachloro-4,7-methane-3a,4,7,7a-tetrahydroindane, the latter more commonly known as clordane.

The compositions may also contain bactericides and fungicides such as sulfur, polysulfides such as lime-sulfur, the chlorinated phenols, aminomethyl sulfides, copper acylacetonates, copper chelates of beta-keto acids and esters, copper chelates of salicylaldehyde, Burgundy mixture, Bordeaux mixture, the so-called insoluble coppers such as basic copper sulfates, copper oxychlorides, copper calcium chlorides, copper oxides, copper silicates, copper zeolites, and copper thiocyanates, the long-chain quaternary ammonium halides and metallic derivatives of dithiocarbamic acid such as the ferric dimethyldithiocarbamate, zinc dimethyldithiocarbamate, and zinc ethylene bis(dithiocarbamate).

The concentration of the toxicant beta-chloroethyl-p-trichloromethyl benzoate in the acaricidal compositions of the invention will vary according to the adjuvant used and according to the particular method of application and use to which the composition is desired. Generally speaking, the dust and water-dispersible powders of the invention will contain from 0.1 to 10.0 per cent of beta-chloroethyl-p-trichloromethyl benzoate. The concentration of the compound of the invention in solvents will, of course, vary with the solubility of the compound in the particular solvent.

In the application of beta-chloroethyl-p-trichloromethyl benzoate to acarids, the acaricides are sprayed directly on the acarids and loci which are infested or are otherwise applied so that the acarids will come into contact with the acaricidal composition shortly after its application.

The invention is illustrated further by reference to the following examples:

Example I 54.1 parts by weight of ethylene chlorohydrin is heated at reflux temperature at atmospheric pressure while 86 parts by weight of p-trichloromethyl benzoyl chloride is slowly added with stirring. Considerable hydrogen chloride is given off during this addition.

After completing the addition of p-trichloromethyl benzoyl chloride, the mixture is refluxed for a short period to complete the reaction. It is then cooled, diluted with ether, washed with a 10 per cent aqueous solution of sodium carbonate, and then with water and finally dried over sodium sulfate. In order to recover the product, the ether is first distilled off at atmospheric pressure and then the remaining liquid is subjected to vacuum distillation. Unreacted ethylene chlorohydrin is first removed.

There is obtained a yield of 36.4 parts by weight of beta-chloroethyl-p-trichloromethyl benzoate. B. P. 151–161° C./0.8 mm Hg absolute, $n_D^{29.4}$ 1.554.

Example II

The following is a water-dispersible liquid composition of the invention:

| | Per cent |
|---|---|
| Beta-chloroethyl-p-trichloromethyl benzoate | 25 |
| Alkylated naphthalene | 65 |
| Diethyl cyclohexylamine dodecyl sulfate | 10 |

The above composition is of the type commonly known as a liquid concentrate and is readily dispersible in water to provide aqueous spray compositions of suitable concentration. For example when emulsified in water at a dilution of 0.1 to 0.2 per cent of the active compound, beta-chloroethyl-p-trichloromethyl benzoate, a spray composition is obtained which is effective in the control of a wide variety of mites and ticks.

Illustrations of the important species of mites which attack crops and against which the composition of Example II and the other compositions of this invention are suitably applied are: two-spotted mite, citrus red mite, apple bud mite, cyclamen mite, apple red spider, European red mite, common red spider, blackberry mite, Pacific mite, citrus rust mite, pear leaf blister mite, Pacific-spotted mite, and Willamette mite. Beta-chloroethyl-p-trichloromethyl benzoate compositions also control mites of the family Sarcoptidae, such as Sarcoptes, Psoroptes, and Chorioptes, and those of the family Demodicidae and thus are useful for application to domestic animals for the control of mange.

Example III

A water-dispersible powder or dust composition of the invention is prepared by mixing the ingredients tabulated below to obtain a finely divided solid.

| | Per cent |
|---|---|
| Beta-chloroethyl-p-trichloromethyl benzoate | 5 |
| Fuller's earth (average particle size less than 40 microns) | 94 |
| Sulfated castor oil | 1 |

The compositions of this example are applied as a dust or more preferably, are dispersed in water to form an aqueous suspension for application as a spray for the control of acarids.

I claim:

Beta-chloroethyl-p-trichloromethyl benzoate.

JOHN H. BRYDEN.

REFERENCES CITED

The following references are of record in the file of this patent:

UNITED STATES PATENTS

| Number | Name | Date |
|---|---|---|
| 1,393,191 | Altwegg et al. | Oct. 11, 1921 |
| 1,953,629 | Pfaff | Apr. 3, 1934 |
| 1,974,689 | Pfaff | Sept. 25, 1934 |
| 2,211,468 | Marsh | Aug. 13, 1940 |
| 2,267,587 | Dreisbach | Dec. 23, 1941 |
| 2,426,417 | Searle | Aug. 26, 1947 |